(12) United States Patent
Lin et al.

(10) Patent No.: US 7,965,410 B2
(45) Date of Patent: Jun. 21, 2011

(54) AUTOMATIC INK/TONER CONSUMPTION OPTIMIZATION SYSTEM

(75) Inventors: Guo-Yau Lin, Fairport, NY (US); Gerald S. Gordon, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1132 days.

(21) Appl. No.: 11/446,334

(22) Filed: Jun. 2, 2006

(65) Prior Publication Data

US 2007/0279654 A1 Dec. 6, 2007

(51) Int. Cl.
*G06K 15/22* (2006.01)
*G03F 3/08* (2006.01)

(52) U.S. Cl. .......... 358/1.4; 358/518; 358/520; 358/521

(58) Field of Classification Search ............ 358/1.9, 358/518, 3.13, 3.23, 520; 399/27, 12, 13, 399/277; 382/162; 347/9, 19, 43, 86
See application file for complete search history.

(56) References Cited

U.S. PATENT DOCUMENTS

| | | | | |
|---|---|---|---|---|
| 6,057,932 | A  * | 5/2000 | Yoshida et al. | 358/1.9 |
| 6,334,658 | B1 * | 1/2002 | Suzuki | 347/7 |
| 2005/0163515 | A1 * | 7/2005 | Inukai | 399/12 |
| 2005/0219287 | A1 * | 10/2005 | Tatsumi | 347/9 |

\* cited by examiner

*Primary Examiner* — James A Thompson
(74) *Attorney, Agent, or Firm* — Ronald E. Prass, Jr.; Prass LLP

(57) ABSTRACT

This is a system for maximizing the use of colors in cartridges of a color marking system. By controlling the amounts of each color dispensed where the least abundant color is conserved, the life of the cartridge is extended. A sensor tells the system what amounts of each colors remain in the system, and a dispenser controller uses and dispenses the most abundant colors first, preserving the least abundant color necessary to achieve a desired colored marking. GCR (gray component replacement) is used as the fundamental scheme to control the colorants. GCR-like scheme is used for interchanging a particular non-traditional colorant and multiple conventional colorants that make such color.

3 Claims, 3 Drawing Sheets

AUTOMATIC INK/TONER CONSUMPTION OPTIMIZATION SYSTEM

This invention relates to color marking systems, more specifically, to electrostatic marking systems and apparatuses.

BACKGROUND

In Xerography or an electrostatographic process, a uniform electrostatic charge is placed upon a photoreceptor surface. The charged surface is then exposed to a light image of an original to selectively dissipate the charge to form a latent electrostatic image of the original. The latent image is developed by depositing finely divided and charged particles of toner upon the photoreceptor surface. The charged toner being electrostatically attached to the latent electrostatic image areas to create a visible replica of the original. The developed image is then usually transferred from the photoreceptor surface to a final support material, such as paper, and the toner image is fixed thereto to form a permanent record corresponding to the original.

In Xerographic color copiers using a dry toner system, a photoreceptor surface is generally arranged to move in an endless path through the various processing stations of the color xerographic process. The color toner image is then transferred from the photoreceptor to a final support material, such as paper, and the surface of the photoreceptor is prepared to be used once again for the reproduction of a copy of a colored original. In this endless path, several stations, including color toner stations are traversed. These stations may involve one or several color toner dispensing units. In ink jet printers using a liquid ink(s), the ink cartridges are moved back and forth and spray the ink or inks using the nozzles on the paper directly. The present invention and embodiments are used in both dry ink systems and liquid inkjet printing systems.

For color printers, the ink module generally contains multiple colorants: Cyan-magenta-yellow-black is the most commonly used set. When the inks are manufactured within one ink cartridge, most of the time, some ink is going to run out before others, and therefore causes the waste of unused ink. The worst-case scenario would be that a full color ink cartridge is used to print black and white pages. Some printers would provide black only cartridges to mitigate this problem, sometimes come with the cost of inconvenient user operation to replace the cartridges between print jobs. Problems also occur when the CMYK colorants can be replaced individually, for example, most of the color laser printers. Toner cartridge replacement requires maintenance and downtime. Replacing all toner cartridges at the same time would increase the efficiency, but it might result in throwing away a cartridge which is still 50% full.

In today's complex color systems (including printers and copiers) several potential problems need to be addressed and controlled. For example, space and apparatus size must be minimized, including the size of color marking cartridges. Since the amount of colorant, ink or toner) is critical, maximum use of the available colorant is extremely important. A problem in color marking systems is to balance the consumption of the colorant so as to preserve the length of the life of the cartridge containing each colorant. In this same theme, reducing the system down time caused by cartridge replacement has been a reoccurring problem in color marking systems. It is not uncommon for one or more colorants to be exhausted or used before the others, which requires some type of either replacement, resupply, or some time consuming control.

SUMMARY

Certain abbreviations will be used in this disclosure to define embodiments; for example, "C" is cyan, "Y" is yellow, "M" is magenta and "K" is black. "GCR" is gray component replacement, "UCR" is under color removal, and "system" includes electrostatic or other color marking systems. The present embodiments will be defined in relation to electrostatic systems but obviously other color marking systems can use the specifics of the present invention. Also, C, M, Y, and K will be referred to as colorants used to make black markings; however, it is obvious other desired final marking colors can be produced other than black, if required. In other words, the specifics of this invention can be utilized with any colors to make any final mark.

This invention includes a GCR level finder that automatically chooses GCR (gray component replacement/UCR (under color removal)/UCA (under color addition) levels based on the current levels of the ink or toner remaining in the cartridges. The ink or toner levels are detected by the individual sensors. The GCR level is chosen to utilize surplus colorants and prevent the early run-out of a single colorant while the rest is still plenty. The approach also contains a color transformation that takes the GCR level and a source color as the input, and outputs the color in the device color space that describes the physical colorants in the system. The ink or toner cartridge replacement will not be necessary until one of C, M, and Y is out.

Sometimes in color marking systems, separate cartridges are used for each color, and in other cases one cartridge is used to hold and dispense multiple colorants. A color marking system can contain one to multiple cartridges. For example, four separate cartridges can be used to each contain a C colorant, a Y colorant, a M colorant and a black or K colorant. In other situations, one cartridge can contain all of the C, Y, M, and K colorants, each having its own colorant compartment. These colors can be used alone or in mixtures to make most colors including black. When in use, it is normal that one or more color will be depleted before the others; the present embodiments provide a system to maximize the use of each colorant to prolong the useful life of the cartridge or cartridges before a replacement is needed. Besides all colorants in one cartridge, any suitable number of cartridges may be used. Ink cartridge set can have many different configurations; for example:

2 cartridges: CMY, K
3 cartridges: CMY, K, light CMK
4 cartridges: C, M, Y, K
6 cartridges: C, M, Y, K, light C, light M
7 cartridges: C, M, Y, K, light C, light M, light K
8 cartridges: C, M, Y, K, light C, light C, light M, Red, Green
and so on. The present embodiment comprises sensors that will detect the amount of each colorant remaining in the cartridge or cartridges and convey this information to the GCR level finder. Any suitable sensor may be used in the embodiments of this invention. Mechanical, electrical and toner level sensors may be used. TDK makes a series of powder level sensors that can be considered for use in the present invention. The TDK, series TS-L, -M, or H may be suitable. Obviously, the sensitivity and suitability of sensors is influenced by the material form i.e. ink, powder or liquid, and the shape of the developer cartridge that the sensor will be used with.

The GCR level finder will determine what the GRC level is based on the remaining colorant amounts, and feed this GCR level to the color transformation along with the source input color. The color transformation takes the inputs and determines what mixture of colorants is necessary to produce a desired final color, and send this information directly to the marking engine, or store this information in an appropriate format for the marking engine to later produce the final color. For example, if the final mark is black, and certain percentages of C, Y and M are needed in combination to make a black mark, the process of the color transformation will prepare the information for the marking engine on how much of each of available colorants to use. To illustrate further, if the C is the lowest amount of colorant remaining in the cartridge(s), the GCR level finder will pick a higher GCR level, and instruct the color transformation to use a higher GCR setting such that a minimum amount of C will be used in combination with the M, Y, and K. This adaptive GCR technique prolongs the use of the cartridge(s) by using the depleted colorant in greater proportions than the others. The cartridge(s) replacement is needed only when one of the C, M, Y or other available colors is out or totally depleted. However, if K is out, it can be replaced by the equivalent amount of C, M, Y or other available colors.

The present embodiments, therefore, involve a color marking system comprising in a cooperative arrangement at least one color container or cartridge(s), at least one sensor for each of said colors, at least one logic to process the sensor information, and a color transformation. The cartridges house at least three colorants. The sensor is enabled to sense and determine an amount of each colorant remaining in said container(s) or cartridges. The sensor also is enabled to convey information on this amount to the logic and color transformation. This color transformation is adaptively enabled to use said information and determine what mix of colorants are necessary to produce a desired color marking. It will utilize a most abundant color or colors to said marking system and conserve or reduce the usage of a least abundant color or colors to said system. The system is enabled thereby to maximize usage of colors in said container(s) and to minimize frequency of replacement of said container(s) in said system. The system can comprise one cartridge or container to house all of said available colors, or a separate container or cartridge to house each individual color.

Any suitable computing system and hardware/software may be used in the present embodiments. Some suitable examples are front-end software, DPS chips, ASIC or other suitable means.

The device space is a specific color space that one can specify how much of each destination device colorant to use. So for a printer, a device color space can be 4 dimensional (e.g. CMYK), or 5 dimensional (e.g. CMYKR, R for red). If a color is described in the "native" device color space, no color transformation will be needed.

Now, if a color is not described in the native device color space, one will need to convert the source color to destination color. For example, if we are printing an RGB image, we need to transform the color for each pixel from RGB to CMYK.

Sometimes there is a CMYK to CMYK transformation. For example, the source CMYK is described for printer A, but the SAME color is desired on the printer B. Since the physical properties of the colorants for different printers might be different, the digital counts of the source CMYK and the destination CMYK will also be.

DETAILED DESCRIPTION OF DRAWINGS AND PREFERRED EMBODIMENTS

Figure 1:
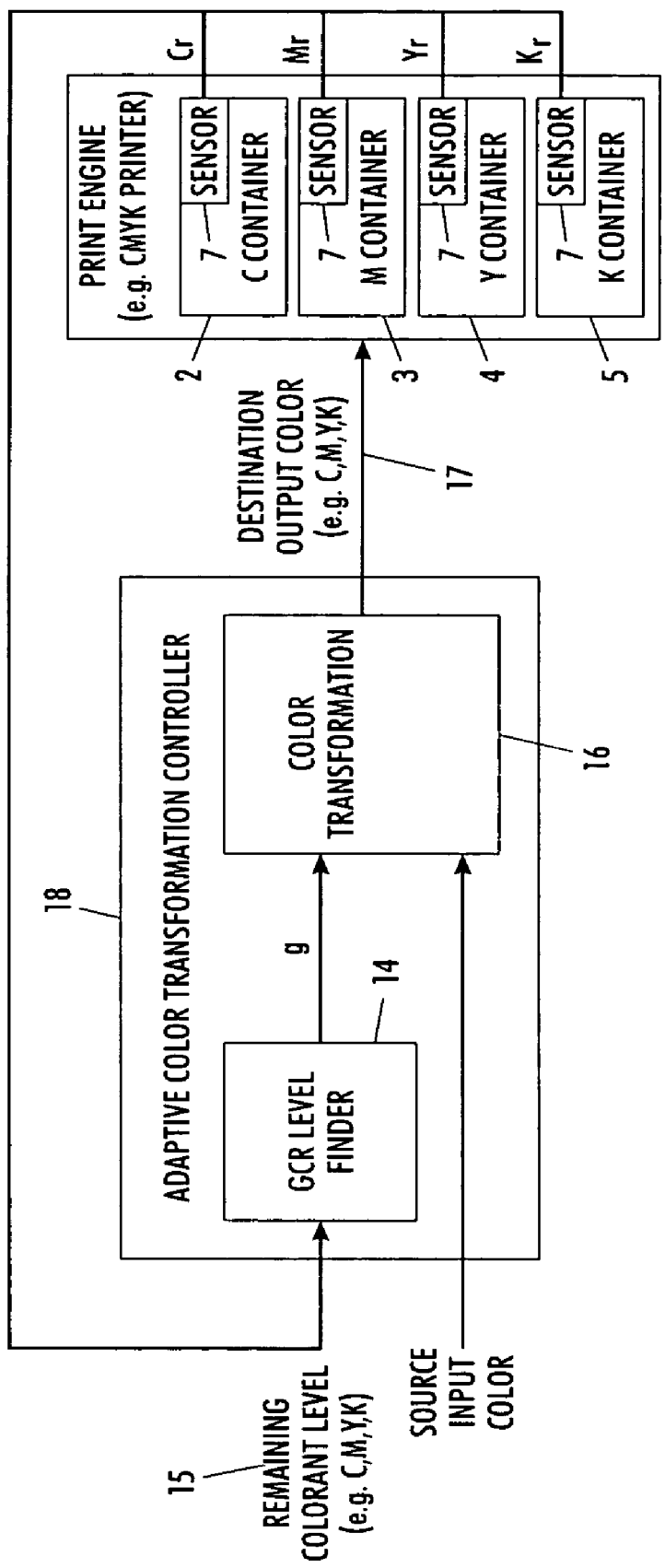
FIG. 1 illustrates a block diagram of an embodiment herein described.

FIG. 1 shows the block diagram of the proposed system. In an adoptive color transformation controller 18 are found a GCR level finder block 14 which chooses GCR levels based on the current CMYK ink levels, or the remaining level $C_r$, $M_r$, $Y_r$, and $K_r$, where the subscript r denotes remaining. The color transformation block 16 takes the GCR level into account and outputs at 17 the color described in the device color space.

If black ink is slightly low (relative to CMY ink), the GCR level finder 14 chooses a lower GCR level, and the color transformation procedure will start to employ UCA (decrease GCR) so some of the black or dark content (for example, black text in the document) will use less K and replace it with the equivalent amount of CMY. If $K_r$ is significantly lower than $C_r, M_r, Y_r$, the GCR level finder 14 chooses lowest GCR level or a stronger UCA to compensate for it. Using higher GCR/UCR is more limited, depending on the CMY concentration of the color. If any of $C_r$, $M_r$, or $Y_r$ is slightly low, for some color, heavier GCR is applied so that some of the CMY that would equivalently make a neutral color will be replaced by K. If any of $C_r$, $M_r$, or $Y_r$ is extremely low, a GCR scheme that makes the maximum use of K is applied. Here is an example of 5-level GCR selection scheme with a special case:

If min(Cr,Mr,Yr)<<Kr, choose maximum GCR—make the maximum use of K,

If min(Cr,Mr,Yr)<Kr, choose heavy GCR,

If min(Cr,Mr,Yr)≈Kr, choose medium GCR,

If min(Cr,Mr,Yr)≈>Kr, choose light GCR,

If min(Cr,Mr,Yr)>>Kr, choose minimum GCR,

If Kr=0, no K is used—replace all K with the equivalent CMY or the output of the color transformation would always have K=0.

The color transformation is done in a printer model based manner in real-time with the cost of computation. It can also be done in a look-up based way. The latter takes a series of LUTs (Look up tables) that are pre-computed with different setting of GCR levels. If the input color space is 3-dimensional (e.g. RGB) with a fix GCR level, one can build a LUT which takes 3 arguments (R, G and B) as input, and outputs 4-dimensional result in CMYK. A different LUT can be built with a different GCR level. As an example, a 5-level setting with maximum/heavy/medium/light/minimum GCR schemes described above is commonly used in color printing systems. In this invention, the GCR level finder would indicate the color transformation to switch between LUTs depending on the remaining ink amount.

The switch in the color transformation can also be implemented as a single LUT. To achieve this, the GCR level is further quantified. For example, the numerical levels for maximum, heavy, medium, light, minimum GCR can be assigned as 1, 0.75, 0.5, 0.25, 0, respectively. The formula described in [019] will become:

$$g=(1+K_r-\min(C_r,M_r,Y_r))/2,$$

where g is the desired numerical GCR level. Therefore, the series of LUTs that were treated as 3-to-4 (e.g. RGB to CMYK) or 4-to-4 (e.g. CMYK to CMYK) transfer functions can further be derived and become 4-to-4 (e.g. RGBg to CMYK) or 5-to-4 (e.g. CMYKg to CMYK) transfer functions with an extra input argument g. Building a 4-to-4 LUT is not in the scope of this invention. But as an example, one can use a serial approach where CMYK are computed from different LUTs for different g, and then do a linear interpolation to obtain the final CMYK values:

$$x=(g-g_1)/(g_2-g_1)*x_2+(g_2-g)/(g_2-g_1)*x_1,$$

where $g_1<g<g_2$, $x \in \{C,M,Y,K\}$, $x_1 \in \{C_1,M_1,Y_1,K_1\}$, $x_2 \in \{C_2, M_2,Y_2, K_2\}$, and $(C_1,M_1,Y_1,K_1)$ and $(C_2,M_2,Y_2,K_2)$ are the table look-up results from using the LUT for $g_1$ and the LUT for $g_2$, respectively.

One can see that the ink/toner cartridge replacement is needed only when one of C, M, or Y is out, but not K, since any use of K can be replaced by the equivalent amount of CMY.

This approach is suitable for consumer marking systems, color (inkjet or laser) printers that apply, and production systems where a precise GCR scheme is not required.

Figure 2:
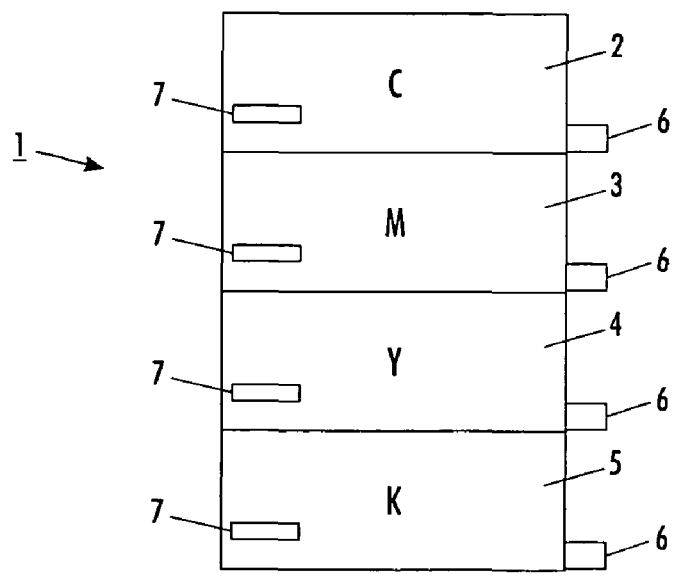
FIG. 2 illustrates a cartridge containing four different colorants or toner useful in the present system.

In FIG. 2, a single cartridge 1 containing all four colorants cyan, magenta, yellow and black (K) all in their own compartments 2, 3, 4 and 5 respectively. Cartridge 1 is in communication with the controller of FIG. 1. Each compartment has its own dispenser 6 that will dispense that particular colorant in the amount specified by the controller in FIG. 1. Each compartment has a sensor 7 that will sense and convey the amount of colorant in each compartment 2, 3, 4 and 5. If the level of C in compartment 2 is lowest (than the other colorants), then the controller will cause a limited amount of C to be dispensed with the other colorants to form a black final mark.

Figure 3:
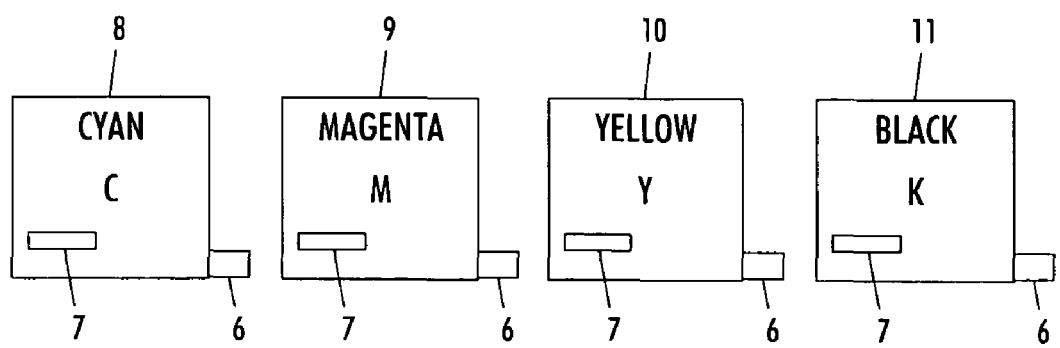
FIG. 3 illustrates separate cartridge each containing one colorant or toner useful in the present system.

In FIG. 3 four cartridges are illustrated (any suitable number of colorants and cartridge may be used in the present invention). Each cartridge 8, 9, 10, and 11 is in communication with the controller and dispenser of FIG. 1. Each cartridge contains only one colorant and has its own sensor 7 and dispenser 6.

Figure 4:
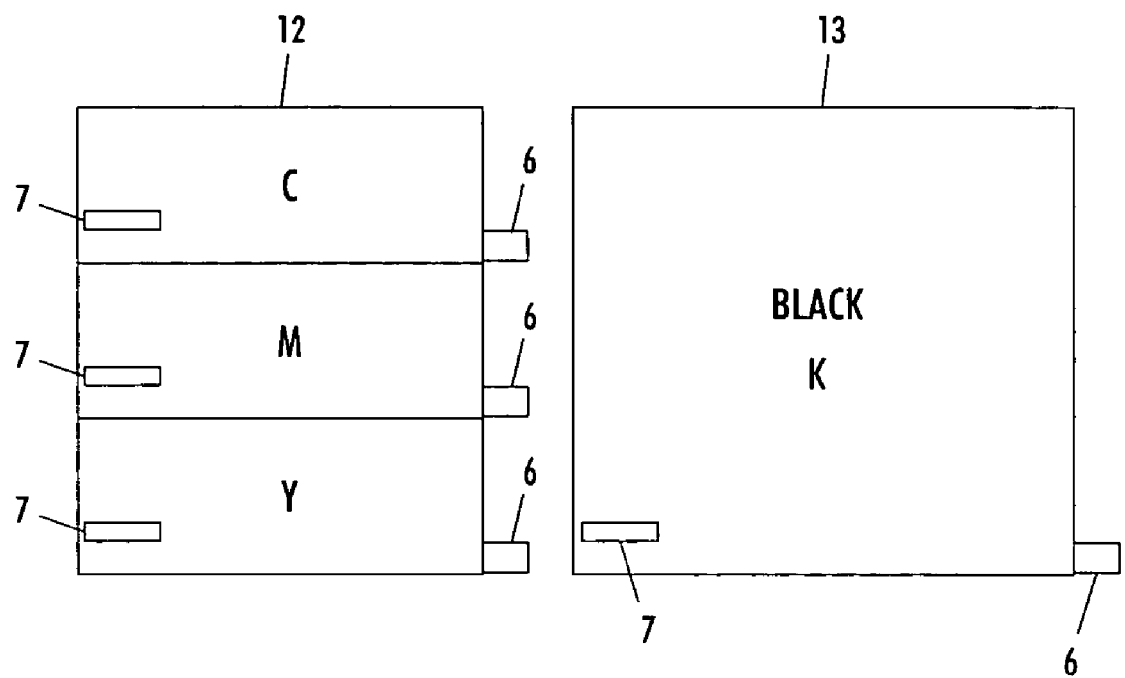
FIG. 4 illustrates two cartridges, one containing a K colorant or toner, and the other containing M, Y, and C, useful in the present system.

In FIG. 4, cartridge 12 contains C, M and Y and cartridge 13 contains only K (black) colorant. Each cartridge 12 and 13 is in communication with controller of FIG. 1 to receive instructions on how much of each colorant to emit from dispensers 6. Each cartridge 12 and 13 has its own sensor 7 to indicate the level of colorant and to convey this level to the controller of FIG. 1.

In summary, the embodiments herein disclosed utilize a color marking system comprising in a cooperative arrangement, at least one color cartridge, at least one sensor for each of said colors, at least one logic to process the sensor information, and a color transformation. The cartridges house at least three colorants. The sensor is enabled to sense and determine an amount of each color remaining in said container(s). The sensor also is enabled to convey information on said amount to said logic and color transformation. This color transformation is adaptively enabled to use said information and determine what mix of colorants are necessary to produce a desired color marking. It will utilize a most abundant color or colors to said marking system and conserve or reduce the usage of a least abundant color or colors to said system. The system is enabled thereby to maximize usage of colors in said container(s) and to minimize frequency of replacement of said container(s) in said system. The system comprises at least one said cartridge, to house all of said available colorants or the system can comprise a separate cartridge to house each individual colorant. The logic and the color transform comprise a suitable computing system and appropriate software. In one embodiment the colors comprise cyan, magenta, yellow, and black.

In another embodiment, the color marking system comprises in a cooperative arrangement, at least one ink color container or cartridge, at least one sensor, at least one color dispenser and sensor for each of said containers, and a color ink dispenser control. The container(s) comprising the colors Magenta (M), Yellow (Y), Cyan (C) and Black (K). The sensor is enabled to determine and measure an amount of each of said colors remaining in each of said containers and conveying this information to said dispenser control. The dispenser control is enabled to determine data on what mix and amounts of said colors are necessary to produce a black color marking. The color dispenser(s) is adapted to receive said data and to use said data to dispense said mix amounts determined by said controller. The color dispenser is enabled to dispense a lesser amount color of at least one of said M, C, or Y, together with larger amounts of remaining colors to form said black color marking. The lesser amount color being the color least abundant in said containers. This system comprising one said container to house all of said M, C, Y and K colors or comprising a separate M container, a separate Y container, a separate C container, and a separate K container or comprising one said container to house M, Y, and C colors and a separate second container to house said K color. The dispenser control comprises at least one computer with appropriate software. Also, the system requires said sensor (s), said GCR level finding logic, and said adaptive color transformation to be in communication and cooperation which enables them to determine mix, amounts, and control an amount of C, M, Y, and K to form the desired color marking. The colorant controller may also have access to color transformation/color tables, generally in software form.

In FIG. 4, cartridge 12 contains C, M and Y and cartridge 13 contains only K (black) colorant. Each cartridge 12 and 13 is in communication with controller of FIG. 1 to receive instructions on how much of each colorant to emit from dispensers 6. Each cartridge 12 and 13 has its own sensor 7 to indicate the level of colorant and to convey this level to the controller of FIG. 1.

The preferred and optimally preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. A color marking system of an electrostatic marking apparatus, said system comprising a controller and a cartridge having at least four compartments, each said compartment comprising a different colorant, each said compartment comprising a sensor and a dispenser for each of a colorant housed therein, said sensor configured to sense and convey an amount of a colorant in that compartment, said sensor in communication with said controller, wherein said sensors and controller are in communication with a color transformation, said color transformation configured to use information from said sensors to determine what mix and amounts of said colorants are necessary to produce said desired color markings said color transformation configured to convey this information and data to said controller, said controller configured to receive data from said color transformation on what mix and amounts of said colorants are necessary to produce a desired color marking, said dispensers configured to receive said data from said controller and to use said data to dispense mixed amounts of each colorant determined by said controller, and wherein said controller is configured to utilize a most abundant colorant of said colorants contained in said cartridge and reduce a usage of least abundant colorant of said colorants to produce said desired color marking, and wherein said controller is configured to maximize usage of said colorants in said cartridge and to thereby minimize frequency of replacement of said cartridge.

2. A color marking system of an electrostatic marking apparatus comprising:

at least one color cartridge, said cartridge comprising at least four color compartments, each of said compartments comprising at least one sensor and at least one color dispenser, said sensor in communication with a controller, said controller comprising a color dispenser control, said compartments comprising available colors selected from the group consisting of Magenta (M), Yellow (Y), Cyan (C), light Cyan, light Magenta, red-green and Black (K), said sensor enabled to determine and convey information to said controller regarding an amount of each color remaining in said compartments, and said sensor and said controller configured to convey said information to said dispenser control, said controller configured to determine data on what mix and amount of said colors are necessary to produce a desired color making, said color dispenser(s) adapted to receive said data and to use said data to dispense a most abundant of said colors to said marking system and to use said data to minimize or conserve dispensing of a least abundant color of said colors to same marking system, said system thereby enabled to maximize usage of said colors in said cartridge to form said desired color making, and said system also configured to minimize frequency of replacement of said containers because of depletion of at least one of said colors.

3. A method for supplying a desired color marking in an electrostatic color marking apparatus, said method comprising:

providing a cartridge having at least four compartments, each said compartment comprising a different colorant, providing in each said compartment a sensor and a dispenser for each of a colorant housed therein, permitting said sensor to sense and convey an amount of a colorant in that compartment, wherein said sensors and a controller are put in communication with a color transformation, said color transformation configured to use information from said sensors to determine what mix and amount of said colorants are necessary to produce said desired color marking, conveying to said color transformation and to said controller this information and data, said controller receiving this data from said color transformation and determining from said data what mix and amounts of said colorants are necessary to produce a desired color marking, said dispenser each receiving said data and dispensing mixed amount of each colorant as instructed by said controller; and utilizing a most abundant of said colorants contained in said cartridge and reduce a usage of a least abundant colorant of said colorants to produce said desired color marking.

* * * * *